United States Patent [19]

Yamada

[11] 4,443,838

[45] Apr. 17, 1984

[54] REGULATED SINGLE-ENDED SELF OSCILLATING, DC-DC CONVERTER

[75] Inventor: Takeshi Yamada, Nagaokakyo, Japan

[73] Assignee: Omron Tateisi Electronics Co., Kyoto, Japan

[21] Appl. No.: 326,022

[22] Filed: Nov. 30, 1981

[30] Foreign Application Priority Data

Dec. 1, 1980 [JP] Japan .................. 55-169308

[51] Int. Cl.³ .......................................... H02P 13/22
[52] U.S. Cl. ...................................... 363/19; 331/112
[58] Field of Search ................... 363/18, 19, 97; 331/112

[56] References Cited

U.S. PATENT DOCUMENTS

| | | | |
|---|---|---|---|
| 3,435,320 | 3/1969 | Lee et al. | 363/19 |
| 4,376,263 | 3/1983 | Pittroff et al. | 363/19 |
| 4,378,585 | 3/1983 | Bete | 363/19 |

FOREIGN PATENT DOCUMENTS

| | | | |
|---|---|---|---|
| 55-2354 | 1/1980 | Japan | 363/18 |
| 55-34730 | 3/1980 | Japan | 363/19 |
| 55-127883 | 10/1980 | Japan | 363/19 |
| 1152295 | 5/1969 | United Kingdom | 363/19 |

OTHER PUBLICATIONS

Electronics, vol. 19, No. 26, pp. 100-104, (Dec. 21, 1978), 59047 0039.

Primary Examiner—William H. Beha, Jr.
Attorney, Agent, or Firm—Cushman, Darby & Cushman

[57] ABSTRACT

A switching regulator having a blocking oscillator including a transistor, and a transformer with primary, secondary, and positive feedback windings. A rectifying and smoothing circuit is connected to the load and includes a photodiode coupled to a phototransistor connected to the blocking oscillator transistor in the feedback path for adjusting feedback to maintain output voltage at a constant level. A second positive feedback circuit connects between the phototransistor and the blocking oscillator transistor to assure stable oscillation of the blocking oscillator.

8 Claims, 10 Drawing Figures

REGULATED SINGLE-ENDED SELF OSCILLATING, DC-DC CONVERTER

BACKGROUND OF THE INVENTION

The present invention relates to a switching regulator for maintaining the voltage to be applied to a load at a constant level even when the power supply voltage or load varies, and more particularly to a switching regulator of the converter type.

Switching regulators of the converter type include one employing a blocking oscillator. As is well known, the blocking oscillator includes a transformer serving as a feedback circuit. The voltage of a d.c. power supply is fed to the blocking oscillator, in which the voltage is inverted to a.c. voltage. This a.c. voltage appears at the secondary winding of the transformer of the blocking oscillator. The winding is connected to a rectifying smoothing circuit, by which the a.c. voltage is converted to d.c. and supplied to the load.

Such a switching regulator is provided with a stabilizing circuit by which the voltage to be fed to the load is maintained at a constant level even in the presence of variations of the load. This circuit includes a transistor connected in series with the rectifying smoothing circuit and the load as positioned therebetween. Since the transistor is usually in conduction, the current flowing through the transistor produces a heat loss, resulting in a reduced efficiency.

SUMMARY OF THE INVENTION

An object of the invention is to provide a switching regulator for giving output d.c. voltage with high stability despite variations in the power supply voltage or load.

Another object of the invention is to provide a switching regulator of high efficiency.

Another object of the invention is to provide a switching regulator which is adapted for a wider permissible range of variations of the power supply voltage or load in giving a stable output d.c. voltage.

The switching regulator of this invention comprises an oscillator including a three-terminal control element, a rectifying smoothing circuit connected to the output side of the oscillator, excessive voltage detecting means for detecting that the output voltage of the rectifying smoothing circuit has exceeded a predetermined value, means for detecting an excessive current through the oscillator, and means for controlling the period of time during which the three-terminal control element is in a conductive state by detecting the excessive voltage or by detecting the excessive current. Since an excessive voltage detecting signal or excessive current detecting signal is negatively fed back to the three-terminal control element of the oscillator, the output d.c. voltage of the regulator is maintained at a constant level even in the presence of variations in the load or power supply voltage.

Preferably the oscillator is a blocking oscillator including a transistor and a transformer having a primary winding and a positive feedback winding which constitute a positive feedback circuit for the transistor. The rectifying smoothing circuit is connected to the secondary winding of the transformer. The excessive voltage detecting means includes a light emitting diode. When the output voltage of the rectifying smoothing circuit exceeds the predetermined value, current flows through the diode, causing the diode to emit light. A phototransistor is connected to the base of the transistor of the blocking oscillator. The light emitting diode and the phototransistor constitute a photocoupler. When the diode emits light, the duration of the conduction of the oscillator transistor is controlled through the phototransistor. Since no transistor is interposed between and connected in series with the rectifying smoothing circuit and the load unlike the conventional switching regulator, the present regulator does not involve the heat loss that would otherwise result and therefore achieves an improved efficiency. Further because the excessive voltage detecting signal is fed back to the blocking oscillator through the photocoupler, a malfunction is unlikely to occur due to a noise.

The phototransistor has a base terminal, which is controlled by the excessive current detecting signal. This gives improved stability to the output d.c. voltage relative to the variations in the power supply voltage or load. Moreover, even in the event of the load short-circuiting, the blocking oscillator and the rectifying smoothing circuit are protected.

Other features and advantages of the present invention will become apparent from the following description of embodiments with reference to the accompanying drawings.

DESCRIPTION OF THE PREFERRED EMBODIMENTS

Figure 1:
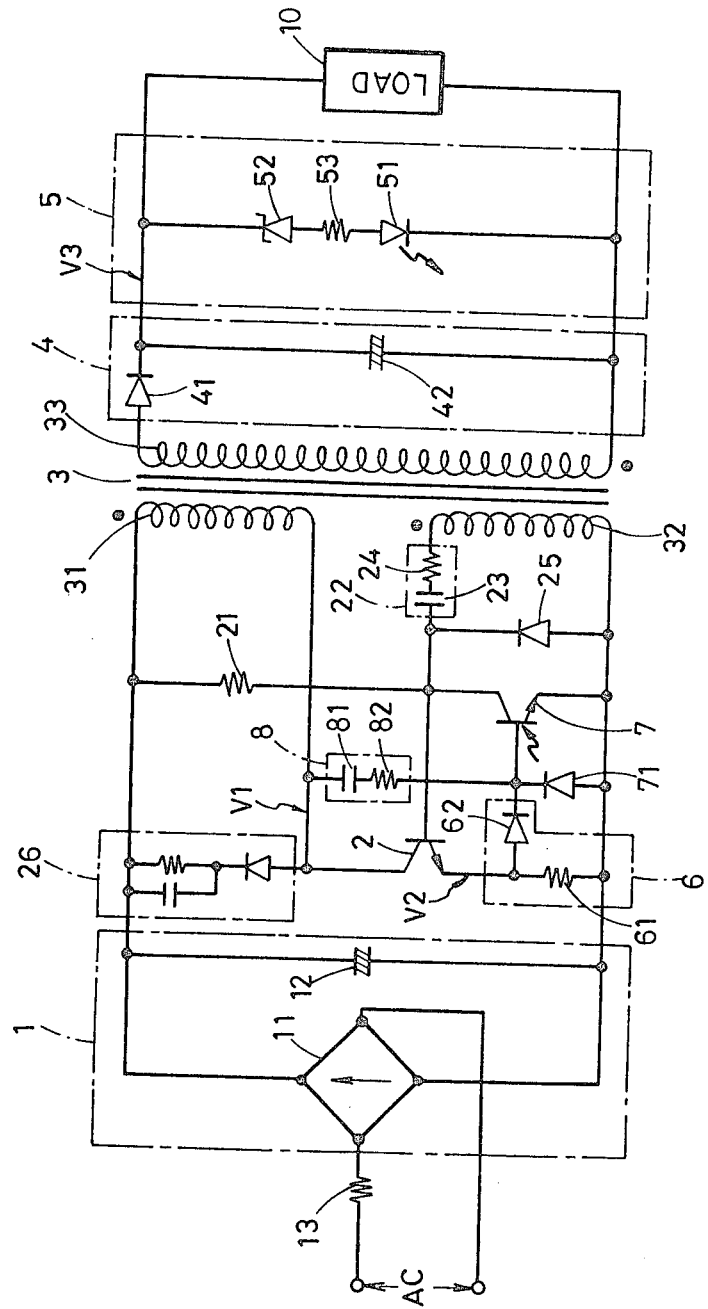
FIG. 1 is a diagram showing the circuit of a preferred embodiment of the invention.

With reference to FIG. 1, a rectifying smoothing circuit 1 comprises a diode bridge 11 and a smoothing capacitor 12 connected to the output terminals of the diode bridge 11. The diode bridge 11 is connected to a.c. input terminals by way of a rush current preventing resistor 13. If the power supply provides direct current, the circuit 1 can be dispensed with. The output voltage of the rectifying smoothing circuit 1 is applied to a blocking oscillator.

The blocking oscillator consists chiefly of a transistor 2, a transformer 3 and a differentiating circuit 22. The transformer 3 has a primary winding 31, a positive feedback winding 32 and a secondary winding 33. The polarity of the voltage induced in these windings 31 to 33 is indicated by black dots, which represent the same polarity. For example, when one end of the winding 31, indicated by a black dot, is of positive polarity, the voltage induced in the windings 32 and 33 are of positive polarity at the ends marked with black dots. The primary winding 31, the transistor 2 and a resistor 61 of the excessive current detecting circuit 6 to be described later are connected in series. The series circuit is connected between the output terminals of the rectifying smoothing circuit 1. A spike eliminator circuit 26 is connected in parallel with the winding 31. The differentiating circuit 22 comprises a capacitor 23 and a resistor 24 and is connected between the base of the transistor 2 and one end of the winding 32. The other end of the winding 32 is connected to the negative terminal of the circuit 1 which terminal is usually grounded. A starting resistor 21 is connected between the positive terminal of the circuit 1 and the base of the transistor 2. A reverse bias preventing diode 25 is connected between the base of the transistor 2 and the negative terminal of the circuit 1. Connected to the secondary winding 33 of the transformer 3 is a rectifying smoothing circuit 4 comprising a rectifying diode 41 and a smoothing capacitor 42.

When the a.c. power supply, for example, is turned on for energizing the circuit, a base current for the transistor 2 flows through the starting resistor 21, and a collector current starts to flow. The collector current flowing through the primary winding 31 induces in the winding 32 a voltage in proportion to the rate of increase of the collector current, the voltage being of positive polarity at the winding end indicated by the black dot. The voltage induced in the winding 32 tends to increase and is differentiated by the circuit 22 and is applied to the base as a positive voltage. This increases the base current, consequently further increasing the collector current. Due to the positive feedback thus effected through the transformer 3, the transistor 2 is eventually saturated (in conductive state). Although a voltage is induced also in the secondary winding 33 of the transformer at this time which voltage is of positive polarity at the winding end marked with the black dot, no current flows since the diode 41 is reversely directed.

When the transistor 2 is saturated, the collector current through the winding 31 and the transistor 2 becomes substantially constant and no longer involves variations. Accordingly the voltage induced in the winding 32 decreases and eventually becomes zero. Since the progressively decreasing voltage of the winding 32 is fed to the differentiating circuit 22, which in turn applies an output to the base of the transistor, the base current starts to decrease. This reduces the collector current of the transistor 2 also, whereby a voltage in proportion to the rate of decrease of the collector current and having a negative polarity at the dot-marked end of the winding 32 is induced in the winding 32, consequently decreasing the base current and further reducing the collector current. The positive feedback thus effected through the transformer 3 eventually brings the transistor 2 into a cutoff state. At this time, a voltage is induced in the secondary winding 33 of the transformer 3 with negative polarity at the dot-marked end, so that the electric energy accumulated in the transformer 3 is released through the diode 41 to charge the capacitor 42.

When the transistor 2 is brought out of conduction, current no longer flows through the transistor 2 or the winding 31. As a result, the induced voltage in the winding 32 increases and finally reaches zero (because it is negative at the dot-marked end). The differentiated output resulting from the increasing voltage of the winding 32 is applied to the base of the transistor 2, with the result that a base current starts flowing, whereupon a collector current starts flowing. The transistor 2 is then saturated again by the positive feedback described above. The starting resistor 21, which is intended to smoothly initiate the oscillation of the blocking oscillator, is not always necessary.

In this way, the transistor 2 is brought into and out of conduction repeatedly, and every time the transistor 2 is cut off, the capacitor 42 of the rectifying smoothing circuit 4 is charged. The electric energy stored in the circuit 4 is supplied to the load 10. When the a.c. input voltage is constant and the load 10 involves no variations, the blocking oscillator is in operation at a constant frequency and applies a constant voltage to the load 10.

With reference to FIG. 1, an excessive voltage detecting circuit 5 is connected between the output terminals of the rectifying smoothing circuit 4. This circuit 5 comprises a Zener diode 52, a resistor 53 and a light emitting diode (hereinafter referred to as "LED") 51 which are connected in series. On the other hand, a phototransistor 7 having a base terminal is connected between the base of the transistor 2 and the negative terminal of the circuit 1. The base of the phototransistor 7 is connected to the emitter of the transistor 2 via a diode 62. A reverse bias preventing diode 71 is connected between the base of the phototransistor 7 and the negative terminal of the circuit 1. The LED 51 and the phototransistor 7 constitute a photocoupler. The excessive current detecting circuit 6 comprises the aforementioned resistor 61 and diode 62. Another resistor can be connected in series with the diode 62. A differentiating circuit 8 for positive feedback is connected between the collector of the transistor 2 and the base of the phototransistor 7. The circuit 8 comprises a capacitor 81 and a resistor 82.

When the impedance of the load 10, for example, increases for one cause or another, causing the output voltage of the rectifying smoothing circuit 4 to increase beyond the level defined by the Zener diode 52, the Zener diode 52 breaks down, permitting a current to flow through the LED 51 for the emission of light. This brings the phototransistor 7 into conduction, with the result that the current which is to flow into the base of the transistor 2 partly flows to the phototransistor 7. The decrease of the base current of the transistor 2 shortens the period of time during which the transistor 2 is conductive. The higher the output voltage of the circuit 4, the larger is the amount of current through the LED 51, the smaller is the collector-emitter resistance of the phototransistor 7 and the larger is the amount of the collector current. Consequently the base current of the transistor 2 further decreases, further shortening the duration of conduction of the transistor 2 and reducing the amount of electric energy stored in the transformer 3. This lowers and stabilizes the output voltage of the circuit 4.

Figure 3:
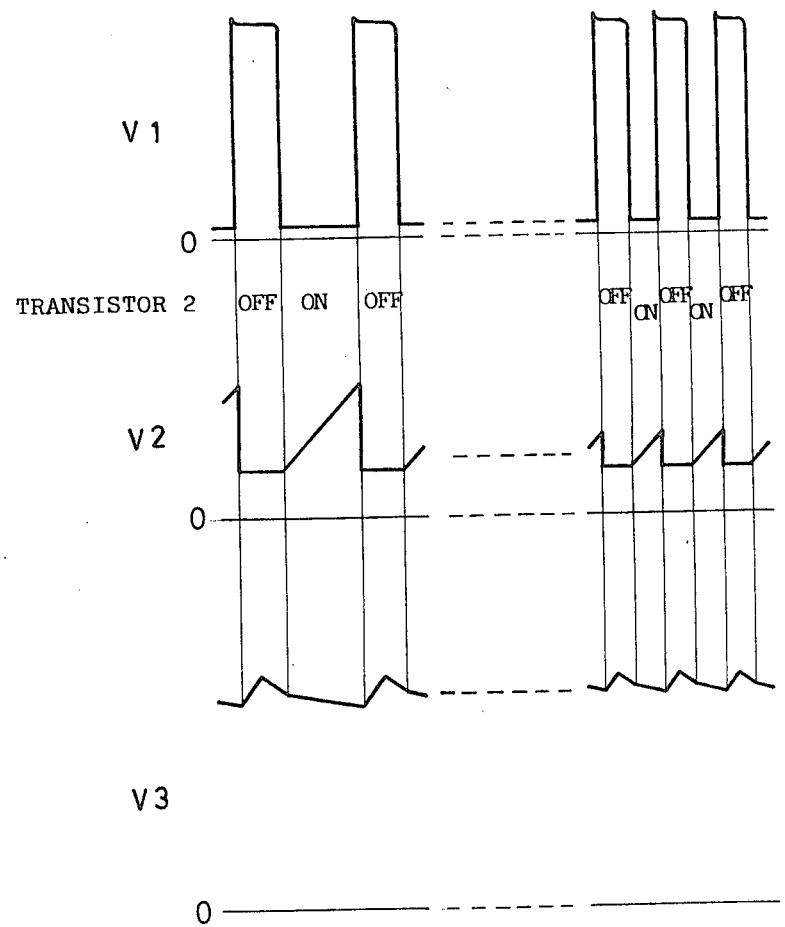
FIG. 3 is a waveform diagram showing the voltages at several points of the embodiment.
Figure 4:
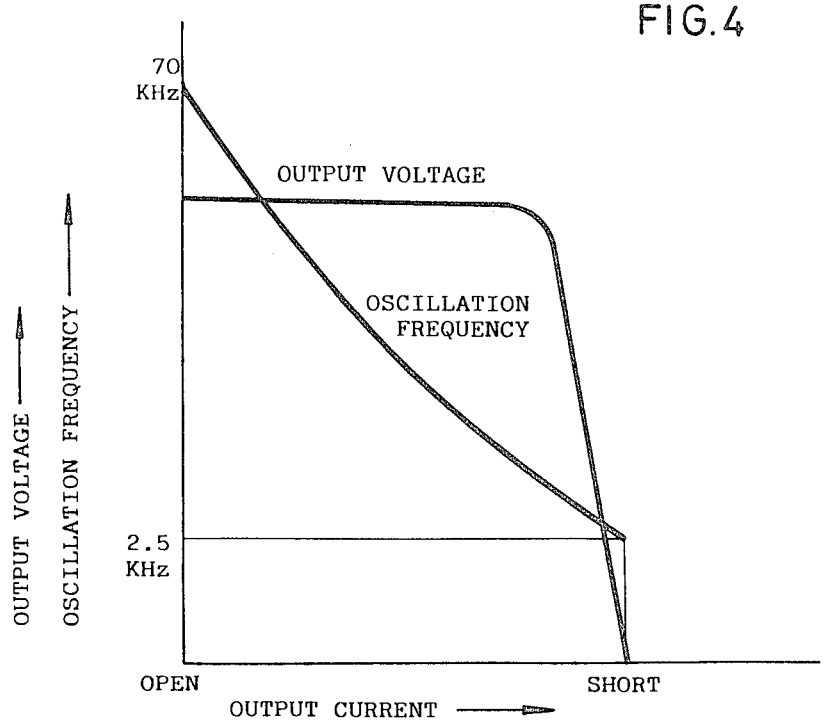
FIG. 4 is a graph showing the operation characteristics of the embodiment.

FIGS. 3 and 4 show how the output voltage is stabilized. FIG. 3 shows the waveforms, as observed, of the collector voltage V1 of the transistor 2, the voltage V2 between the emitter of the transistor 2 and the resistor 61, and the output voltage V3 of the rectifying smoothing circuit 4. In this diagram, the voltage V2 only is shown on a greatly enlarged scale. When the phototransistor 7 is brought into conduction, the duration of conduction of the transistor 2 becomes shorter, consequently increasing the oscillation frequency of the blocking oscillator. Since the capacitor 42 is charged when the transistor 2 is off, the voltage V3 is slightly pulsating. FIG. 4 shows the output voltage of the circuit 4 and the oscillation frequency characteristics of the blocking oscillator relative to the output current of the circuit 4. When the impedance of the load 10 increases and the output current decreases, the oscillation frequency increases, with the result that the output voltage is maintained at a constant level.

If the a.c. power supply voltage increases for one cause or another to pass an excessive current through the transistor 2, the voltage V2 on the resistor 61 increases, and this voltage V2 is applied to the base of the phototransistor 7 via the diode 62 to bring the phototransistor 7 into conduction. This also shortens the duration of conduction of the transistor 2. In other words, the collector-emitter impedance (resistivity) of the transistor 2 increases to protect the transistor 2 from an excessive current and prevent the saturation of the transformer 3. Since the frequency of the blocking oscillator increases, the output energy supply also decreases to prevent the increase of the output voltage.

When the impedance of the load 10 decreases to a very small value or when the load 10 short-circuits, an excessive output current tends to flow, and the current through the transistor 2 also tends to increase. Consequently the phototransistor 7 becomes conductive, and the transistor 2 non-conductive. The output voltage decreases as shown in FIG. 4. Accordingly the flow of excessive output current is prevented, and the transistor 2 is also protected. When the operation is thereafter resumed, the output voltage will not rise abruptly, so that the circuit 4 is also protected.

Figure 2:
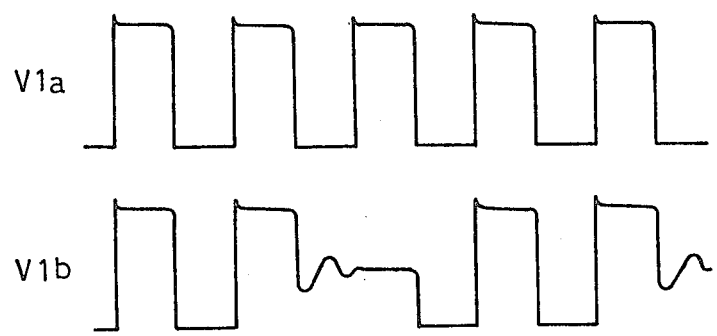
FIG. 2 is a waveform diagram showing the oscillation of a blocking oscillator.

The differentiating circuit 8 performs the following function. When the phototransistor 7 starts to conduct, the collector-emitter resistivity of the transistor 2 increases, whereupon the collector voltage V1 starts rising. The circuit 8 detects the increasing variation of the voltage V1 and positively feeds back the output to the base of the phototransistor 7, thus accelerating the conduction of the phototransistor 7. When the transistor 2 starts to conduct after the release of energy at the secondary winding of the transformer 3, the collector voltage V1 conversely lowers. Since the decreasing variation of the voltage V1 is given by the differentiating circuit 8 to the base of the phototransistor 7 as a negative voltage, the phototransistor 7 is brought out of conduction, permitting the transistor 2 to conduct rapidly to saturation. When the output voltage rises or when the a.c. power supply voltage rises, the phototransistor 7 comes into conduction to decrease the base current of the transistor 2 as described above. Consequently the transistor 2 is likely to come into or out of conduction unstably. However, the positive feedback by the circuit 8 to the phototransistor 7 assures stable oscillation of the blocking oscillator. FIG. 2 shows the collector voltage V1 of the transistor 2. The waveform V1a shown represents the voltage when the circuit 8 is provided, while the waveform V1b represents unstable oscillation in the absence of the circuit 8. In the latter case, intermittent oscillation will result, or a cessation is likely to occur between the conductive state and the nonconductive state of the transistor 2, giving rise to greater ripples. The circuit 8 sustains stable oscillation and widens the permissible range of variations of the input voltage and load.

Figure 5:
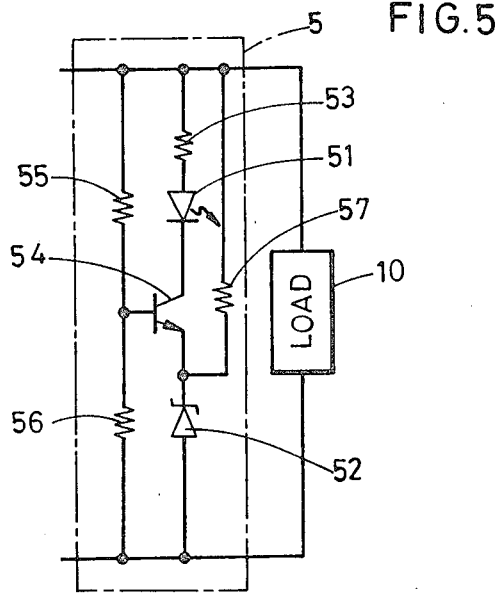
FIG. 5 is a circuit diagram showing another example of excessive voltage detecting circuit.

FIG. 5 shows a modification of the excessive voltage detecting circuit 5. A transistor 54 is connected in series with the LED 51, Zener diode 52 and resistor 53. Resistors 55 and 56 are connected between the two terminals of the rectifying smoothing circuit 4. The base of the transistor 54 is connected to the junction of these resistors 55, 56. The emitter of the transistor 54 is connected via a resistor 57 to the positive terminal of the circuit 4. When the output voltage of the circuit 4 rises, the transistor 54 is brought into conduction, passing a current through the LED 51, which in turn emits light.

Figure 6:
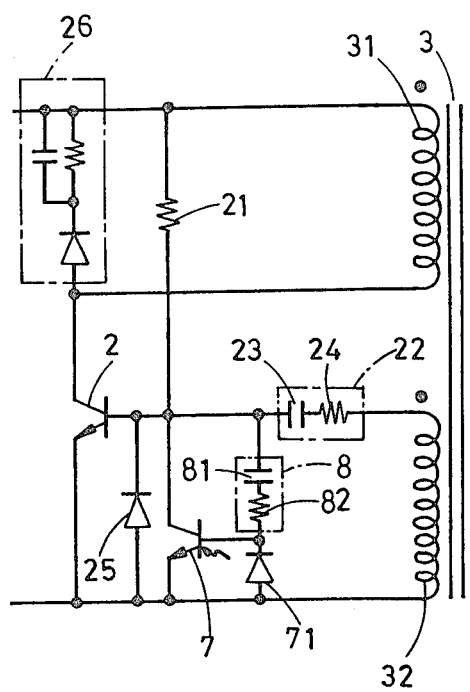
FIG. 6 is a fragmentary circuit diagram showing a positive feedback differentiating circuit included in the blocking oscillator and connected to a phototransistor in a different mode.

FIG. 6 shows another arrangement of the differentiating circuit 8 for positive feedback to the phototransistor 7. The terminal of the circuit 8 which is connected to the collector of the transistor 2 in FIG. 1 is connected to the base of the transistor 2 in FIG. 6. The signal differentiated in the circuit 8 and resulting from the voltage induced in the winding 32 is positively fed back to the base of the phototransistor 7. The excessive current detecting circuit 6 is not shown in the circuit of FIG. 6 or in those of FIGS. 7 to 10 to follow.

Figure 7:
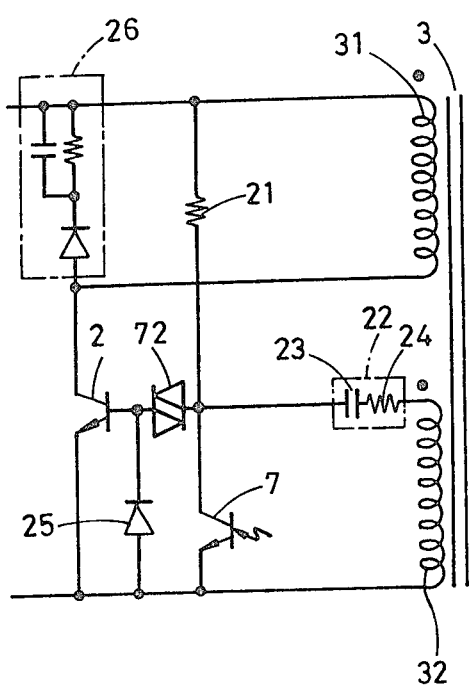
FIGS. 7 and 8 are fragmentary circuit diagrams each showing a modification for detecting excessive voltage with improved sensitivity.

FIG. 7 shows a modification for detecting excessive voltages with improved sensitivity. The phototransistor 7 shown has no base terminal. A bidirectional diode 72 is connnected between the collector of the phototransistor 7 and the base of the transistor 2. This diode 72 is replaceable by two diodes directed in opposite directions and connected together in parallel, Zener diode or resistor. The collector voltage of the phototransistor 7 is higher by a value corresponding to the voltage drop due to the base current of the diode 72. When an excessive voltage is detected, therefore, the phototransistor 7 conducts quickly. When the collector voltage of the phototransistor 7 is lower, a sufficient collector current is not obtainable unless a sufficient amount of light is incident on the transistor 7. Since the current flowable through the LED 51 is predetermined, it is impossible to pass a current exceeding the predetermined value through the LED 51, which then will not give an amount of light for obtaining a sufficient collector current for the phototransistor 7. However, the phototransistor 7 of the circuit shown in FIG. 7 has a higher collector voltage, so that even when the amount of incident light is small, a sufficient collector current flows through the transistor 7. Consequently the circuit is responsive to excessive voltages over a wider range to enlarge the permissible range of variations in the power supply voltage and load.

Figure 8:
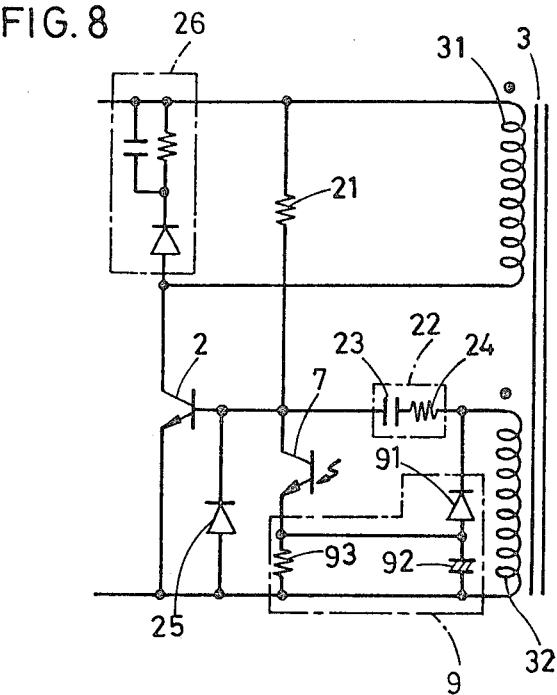

FIG. 8 shows another modification serving the same purpose as the circuit of FIG. 7. Connected to the phototransistor 7 is a bias circuit 9 comprising a series circuit of a diode 91 and a capacitor 92 which circuit is connected in parallel with the winding 32, and a resistor 93 connected to the emitter of the phototransistor 7. The junction of the diode 91 and the capacitor 92 is connected to the emitter of the phototransistor 7. When a voltage is induced in the winding 32 with negative polarity at the dot-marked end, the capacitor 92 is charged through the diode 91. Since the negative voltage on the capacitor 92 is applied to the emitter of the phototransistor 7, the phototransistor 7 has an increased potential difference between its collector and emitter. Consequently the phototransistor quickly conducts even if the amount of light incident thereon from the LED 51 is small.

Figure 9:
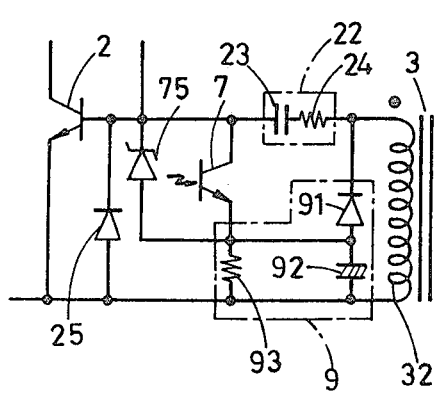
FIGS. 9 and 10 are fragmentary circuit diagrams each showing a modification for handling variations in the power supply voltage and load.

FIG. 9 shows another modification which is adapted to overcome variations in the power supply voltage and load. The circuit shown comprises the circuit of FIG. 8 which has a Zener diode 75 further incorporated therein. The Zener diode 75 is connected between the base of the transistor 2 and the emitter of the phototransistor 7. The diode 75 has its anode negatively biased by the charge in the capacitor 92. When an excessive current flows due to a rise in the power supply voltage, an increased voltage is induced in the winding 32 to lower the potential of the capacitor 92. When the potential difference across the two terminals of the Zener diode 75 exceeds the Zener voltage, the diode 75 breaks down, permitting the base current of the transistor 2 to flow into the Zener diode 75. This reduces the duration of conduction of the transistor 2 to keep the output voltage constant as already described. This circuit is effective also against variations of the load 10, against which the Zener diode 75 and the phototransistor 7 function in two stages, greatly enlarging the permissible range of load variations.

Figure 10:
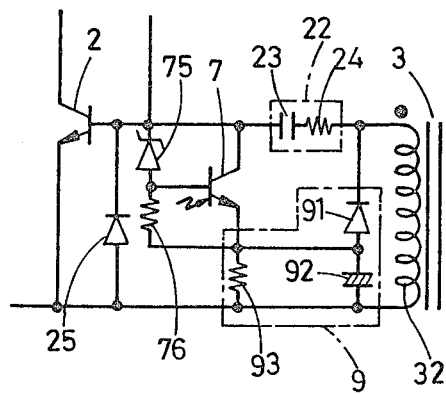

FIG. 10 shows a further improvement in the circuit of FIG. 9. The phototransistor 7 has a base terminal. The anode of the Zener diode 75 is connected to the base of the phototransistor 7. The base and the emitter of the phototransistor 7 are connected via a resistor 76. The Zener diode 75, the phototransistor 7 and the resistor 76 constitute an amplifying circuit. When the diode 75 breaks down to pass a current, the base potential of the phototransistor 7 becomes higher than the emitter potential thereof, so that the current flows also to the phototransistor 7 to further lower the base current of the transistor 2.

What is claimed is:

1. A switching regulator comprising:
   an oscillator including a first transistor and a transformer having a primary winding connected to said transistor, a secondary winding and a positive feedback winding connected to said transistor,
   a rectifying and smoothing circuit connected to said secondary winding,
   excessive voltage detecting means for detecting that the output voltage of the rectifying and smoothing circuit has exceeded a predetermined value,
   a second transistor connected to said first transistor for controlling the duration of conduction of the first transistor by detecting the excessive voltage, and
   a positive feedback circuit connected between the collector of the first transistor and the base of the second transistor for stabilizing the oscillation of the oscillator.

2. A switching regulator as defined in claim 1 which further comprises means for detecting an excessive current through the oscillator, and the duration of conduction of the three-terminal control element is controlled also by detecting the excessive current.

3. A switching regulator as defined in claim 1 wherein the excessive voltage detecting means includes a light emitting diode which emits light when the output voltage of the rectifying smoothing circuit exceeds a predetermined value, the second transistor is a phototransistor connected to the base of the first transistor and wherein the light emitting diode and the phototransistor constitute a photocoupler.

4. A switching regulator comprising:
   a blocking oscillator including a transistor and a transformer having a primary winding connected to said transistor, a secondary winding and a positive feedback winding constituting a positive feedback circuit for the transistor,
   a rectifying and smoothing circuit connected to the secondary winding of the transformer,
   an excessive voltage detecting circuit including a light emitting diode for detecting the output voltage of the rectifying and smoothing circuit has exceeded a predetermined value whereupon a current flows through the light emitting diode, and
   a control element connected to said transistor and said excessive voltage detecting circuit for controlling the duration of conduction of the transistor of the blocking oscillator by detecting the excessive voltage,
   a bias circuit connected to the control element
   wherein the control element is a phototransistor connected to the base of the transistor of the blocking oscillator, and
   wherein the light emitting diode and the phototransistor constitute a photocoupler.

5. A switching regulator as defined in claim 4 which further comprises a circuit for detecting an excessive current through the blocking oscillator, the phototransistor having a base terminal, the base of the phototransistor being controllable by an excessive current detecting signal.

6. A switching regulator as defined in claim 4 wherein the phototransistor has a base terminal, and a differentiating circuit is provided for positively feeding back the collector voltage of the transistor of the blocking oscillator or the voltage induced in the positive feedback winding of the transformer to the base of the phototransistor.

7. A switching regulator as defined in claim 4 which further comprises a voltage drop element connected between the control element and the base of the transistor of the blocking oscillator.

8. A switching regulator as defined in claim 4 which further comprises a Zener diode connected between the bias circuit and the base of the transistor of the blocking oscillator.

* * * * *